(12) United States Patent
Suzuki et al.

(10) Patent No.: US 7,119,275 B2
(45) Date of Patent: Oct. 10, 2006

(54) PROTECTOR

(75) Inventors: Takashi Suzuki, Mie (JP); Hiroshi Sasaki, Kanagawa (JP)

(73) Assignees: Sumitomo Wiring Systems, Ltd., Mie (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/213,964

(22) Filed: Aug. 30, 2005

(65) Prior Publication Data

US 2006/0090916 A1    May 4, 2006

(30) Foreign Application Priority Data

Aug. 31, 2004    (JP) ............... 2004-251644

(51) Int. Cl.
*H02G 3/04*    (2006.01)
(52) U.S. Cl. .............. 174/49; 174/48; 174/68.1; 248/68.1; 138/108
(58) Field of Classification Search ........... 174/49, 174/135, 65 R, 68.1, 72 A, 74 R, 74 A, 72 R, 174/72 C, 48; 248/68.1, 56; 138/108, 109; 285/93, 94
See application file for complete search history.

(56) References Cited

U.S. PATENT DOCUMENTS 5,444,182 A    8/1995    Hoshino et al.
6,211,465 B1   4/2001    Streit
6,875,918 B1 * 4/2005    Sudo et al. ............... 174/49

FOREIGN PATENT DOCUMENTS

JP    A 08-168136    6/1996
JP    A 08-182146    7/1996

* cited by examiner

*Primary Examiner*—Dhiru R. Patel
(74) *Attorney, Agent, or Firm*—Oliff & Berridge, PLC

(57) ABSTRACT

A protector body is formed with a semi-annular portion. The semi-annular portion has an inner peripheral surface projected with a rib to engage with a trough portion of the corrugated tube. The lid is provided with a larger-diameter lid and a smaller-diameter lid depending upon a diameter of the corrugated tube. The larger-diameter lid is made symmetric in form with the semi-annular portion formed in the protector body while the smaller-diameter lid has a flange projecting, at both sides, from a semi-annular frame portion corresponding to a diameter of small-diameter corrugated tube and a rib, to engage in a trough portion of the corrugated tube, projecting in an inner peripheral surface of the semi-annular frame portion. The flange on both sides has a lock portion at tips thereof thus enabling locking with the locked portion of the semi-annular frame portion.

6 Claims, 7 Drawing Sheets

PROTECTOR

BACKGROUND OF THE INVENTION

1. Field of the Invention

The present invention relates to a protector, and more particularly to a protector having a positioning holder, for a corrugated tube attaching a group of electric wires from outside, capable of attaching the corrugated tube where different in diameter.

2. Description of the Related Art

In a wire harness on an automobile, a group of wire lines are penetrated through a protector, formed by a resin mold product, in a required wire-laid region in order for route regulation and improved protection of significant lines. In the protector, a group of electric wires of a wire harness are passed through a protector body and then covered with a lid to close an upper opening of the protector body, thus effecting joining those together by locking.

As shown in FIG. 6, in the case of armoring a group of electric wires inserted in a protector 1 with a corrugated tube having alternate ridge portions and trough portions continuing lengthwise or in the case of armoring an electric wire drawn from the protector with a corrugated tube and holding the corrugated tube at its one end in position in the protector, those are provided by joining together a protector body 2 having a Semi-annular portion for armoring the corrugated tube and a lid 3 by a thin-walled hinge 4. Ribs 2a, 3a circumferentially extending are provided projecting in the inner peripheral surface of the protector body 2 and lid 3. After the rib 2a of the protector body 2 is fit in the trough portion in the corrugated tube lower half, the lid 3 is rotated toward the protector body 2 about the thin-walled hinge 4. The rib 3a of the lid 3 is fit in the trough portion of the corrugated tube upper half, thereby fixing the corrugated tube in position in the protector 1.

However, with the protector 1 as above, the corrugated tubes, to be fit and engaged with the ribs 2a, 3a provided in the protector body 2 and lid 3, are limited to those corrugated tubes having a predetermined diameter. Accordingly, because a different diameter of corrugated tube cannot be fixed in position, there is a problem that the protector 1 must be made matched to a corrugated tube diameter.

Particularly, in the case of a protector 1 integrally molded that the protector body 2 and the lid 3 are joined together by a thin-walled hinge 4, the entire protector 1 must be fabricated correspondingly to a corrugated tube diameter thus raising a problem of cost increase.

Therefore, inventors have provided a protector 1' shown in FIG. 7, in JP-A-8-168136. In the protector 1', a protector body 2' and a lid 3' are made separate. The protector body 2' and lid 3', at its inner peripheral surface, is provided with ribs 2a', 3a' circumferentially projecting for fit in a trough portion 5a of the corrugated tube 5'. The rib 3a' of the lid 3' has a height changed correspondingly to a diameter of a corrugated tube 5' to be inserted in the protector 1'. When the corrugated tube 5' has a large diameter, the rib 3a' is made smaller in height. Meanwhile, when the corrugated tube 5' has a smaller diameter, the rib 3a' is made larger in height. Thus, positioning is made possible for the different diameters of corrugated tubes 5'. Accordingly, even where the corrugated tube 5' has a different diameter, the protector body 2' can be used commonly. This satisfactorily requires to form the lid 3' correspondingly to a corrugated tube 5' diameter, making it possible to reduce the cost.

However, with the protector 1' provided in JP-A-8-168136, when the corrugated tube 5' to be inserted in the protector 1' smaller in diameter, the rib 3'a projecting in the lid 3' is made higher and hence easier to deform. Thus, there is a problem that the rib 3'a is not easy to fit in a trough portion 5a' of the corrugated tube 5'.

Meanwhile, the lid 3' is equal in outer diameter regardless of the diameter of the corrugated tube 5' to be inserted in the protector 1', raising a problem that the protector 1' is made greater in outer shape even where the corrugated tube 5' is smaller in diameter.

Furthermore, inventors have provided a protector 1" shown in FIG. 8, in JP-A-8-182146. The protector 1" has a protector body 2" and a lid 3" separately. A lib 2a" similar to the foregoing is provided in the protector body 2" while a through-hole 3b" is provided in the lid in a position opposed to the rib 2a". By engaging a retainer 6" having a rib 6a" in the through-hole 3b", the rib 6a" is fit in a trough portion 5a" of a corrugated tube 5" into a fixation in position. The retainer 6" has a rib height corresponding to the diameter of the corrugated tube 5" inserted in the protector 1". By providing retainers 6 in plural kinds, the retainers 6" corresponding to the diameter of the corrugated tube 5" are structurally engaged in the through-hole 3b" of the lid 3".

However, even with the protector 1" provided in JP-A-8-182146, there is a problem that the rib 6a" deforms to make it not easy to fit in the trough portion 5a" of the corrugated tube 5" and the protector 1" is increased in its exterior shape. Furthermore, there is another problem of increased number of components because of attaching the retainer 6" as a separate member.

SUMMARY OF THE INVENTION

It is an object of the invention to fix a corrugated tube in position in a protector thus making the positioning operation of a corrugated tube easy, without unnecessarily size-increasing the protector in its exterior shape.

According to one aspect of the invention, a protector having an attachment for a corrugated tube attaching an electric wire from outside, the protector including: a protector body being formed with a semi-annular portion to receive the corrugated tube at a half thereof, the semi-annular portion having an inner peripheral surface projected with a rib to engage with a trough portion of ridge-and-trough portion continuing lengthwise of the corrugated tube; a lid being fitted with the semi-annular portion of the protector body, and the lid receiving the corrugated tube at other half thereof, the lid having at least one of larger-diameter lid and a smaller-diameter lid in accordance with a diameter of the corrugated tube, the larger-diameter lid being symmetrically formed with the semi-annular portion of the protector body and having a lock portion and a locked portion at both ends in a direction of diameter thereof which are abut with, the smaller-diameter lid having: a flange portion projecting from both sides of semi-annular frame portion corresponding to a diameter of small-diameter corrugated tube; and a rib projecting in an inner peripheral surface of the semi-annular frame portion to engage with a trough portion of the small diameter corrugated tube, the flange portion having a lock portion at a tip of both sides of the semi-annular frame portion, the lock portion of the flange portion capable of locking with a locked portion of the semi-annular frame portion.

According to the above structure, where the corrugated tube to be inserted in the protector is larger in diameter, the lid is in a symmetric form with the semi-annular portion of the protector body, to engage the corrugated tube by a rib provided in the lid. Meanwhile, where the corrugated tube is smaller in diameter, the lid is provided with a semi-annular frame portion corresponding to a diameter of the corrugated tube, to engage the corrugated tube by a rib provided in the semi-annular frame portion. Thus, any one of the corrugated tubes different in diameter can be fixed in position in the protector.

Because the protector body and the lid are provided separate, the protector body can be used commonly for different diameters of corrugated tubes. This makes it satisfactory to manufacture only a lid matched to a diameter of the corrugated tube, reducing the manufacturing cost of the protector.

Furthermore, the lid is provided with the semi-annular frame made corresponding to a diameter of the corrugated tube. When the corrugated tube is smaller in diameter, the lid semi-annular frame can be made smaller in diameter correspondingly. Accordingly, where the corrugated tube is smaller in diameter, the protector can be reduced in size. In this case, because the semi-annular frame portion and the corrugated tube are arranged in proximity, there is no need to increase the height of the lib for fitting in a trough portion of the corrugated tube. Accordingly, the rib can be prevented from deforming and be easily fit in a trough portion of the corrugated tube.

In the smaller-diameter lid, where the smaller-diameter corrugated tube is greatly different in diameter as compared to the larger-diameter corrugated tube, the flanges are provided projecting at outer-peripheral intermediate positions distant a required amount from respective tips of the semi-annular frame portion. Namely, the flanges are projected at the outer-peripheral intermediate points instead of at both ends of the semi-annular frame thus projecting the both ends of semi-annular frame at positions inner than the flanges for lock-joined with the protector body. Thus, the smaller-diameter corrugated tube at its semi-annular half can be positively armored by the semi-annular frame of the smaller-diameter lid, and positively held in position by utilization of the protector-body semi-annular portion for larger-diameter corrugated tube.

Preferably, the rib provided in the inner peripheral surface of the semi-annular portion of the protector and the rib provided in the semi-annular portion of the lid are the same in height.

As noted before, in case the lid rib is increased in height, the rib is to readily deform, thus being not easily fit in a trough portion of the corrugated tube. Besides, the lid increases in outer size. Meanwhile, in case the rib is lowered in height, the rib inserted in the corrugated tube trough portion is not sufficiently engaged with the ridge portion thus making impossible to obtain a sufficient engagement force. Accordingly, by making the rib provided in the inner peripheral surface of the semi-annular portion of the protector and the rib provided in the semi-annular portion of the lid the same in height thus fitting the rib in nearly the entire periphery of the trough portion in the corrugated tube, the corrugated tube can be fixed in position stably in the protector.

In a protector for fixing an inserted corrugated tube in position, when the corrugated tube is larger in diameter, the lid is in a symmetric form with the semi-annular portion of the protector body. The corrugated tube is engaged with the rib provided in the lid. Meanwhile, when the corrugated tube is smaller in diameter, the lid is provided with a semi-annular frame corresponding to a diameter of the corrugated tube. The corrugated tube is engaged by the rib provided in the semi-annular frame. Thus, corrugated tubes different in diameter can be fixed in position in the protector.

Meanwhile, because the protector and the lid are provided separate, the protector body can serve commonly for different diameters of corrugated tubes. Because it is satisfactory to fabricate only the lid matched to a diameter of the corrugated tube, protector manufacture cost can be reduced.

Furthermore, because the semi-annular frame provided in the lid is made in a form corresponding to a diameter of the corrugated tube, the semi-annular frame can be made small to size-reduce the protector when the corrugated tube is small in diameter.

Meanwhile, because the inner peripheral surface of semi-annular frame and the outer peripheral surface of corrugated tube are placed proximate and hence the rib of the semi-annular frame is not raised in height, the rib can be prevented from deforming and easily fit in a trough portion of the corrugated tube.

BRIEF DESCRIPTION OF THE DRAWINGS

These and other objects and advantages of this invention will become more fully apparent from the following detailed description taken with the accompanying drawings in which:

FIG. 4A is a sectional view showing a state the larger-diameter corrugated tube is attached on the protector while

DESCRIPTION OF THE PREFERRED EMBODIMENTS

Figure 1:
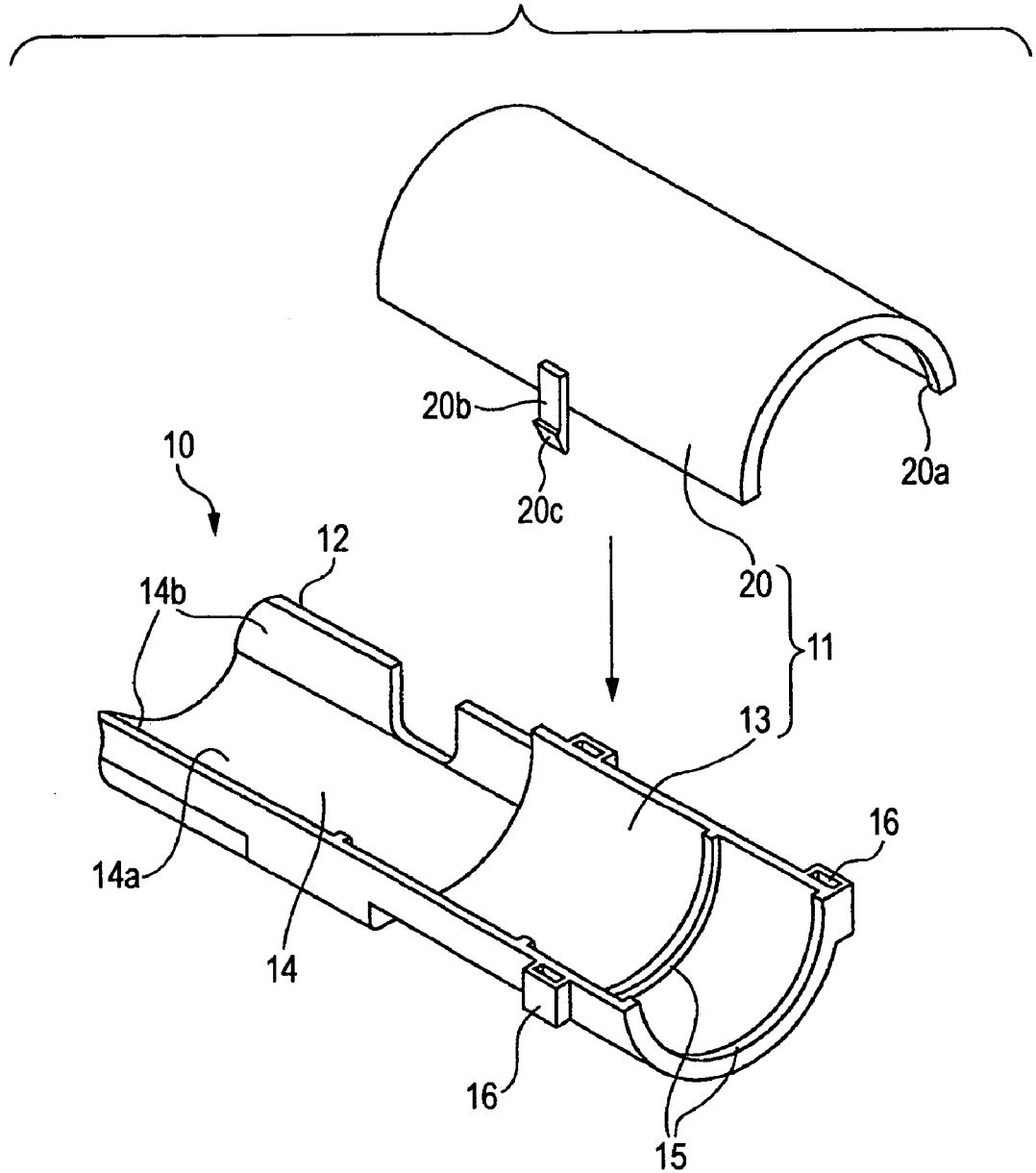
FIG. 1 is a perspective view showing a protector made up by a protector body and a larger-diameter lid according to an embodiment of the present invention.
Figure 2:
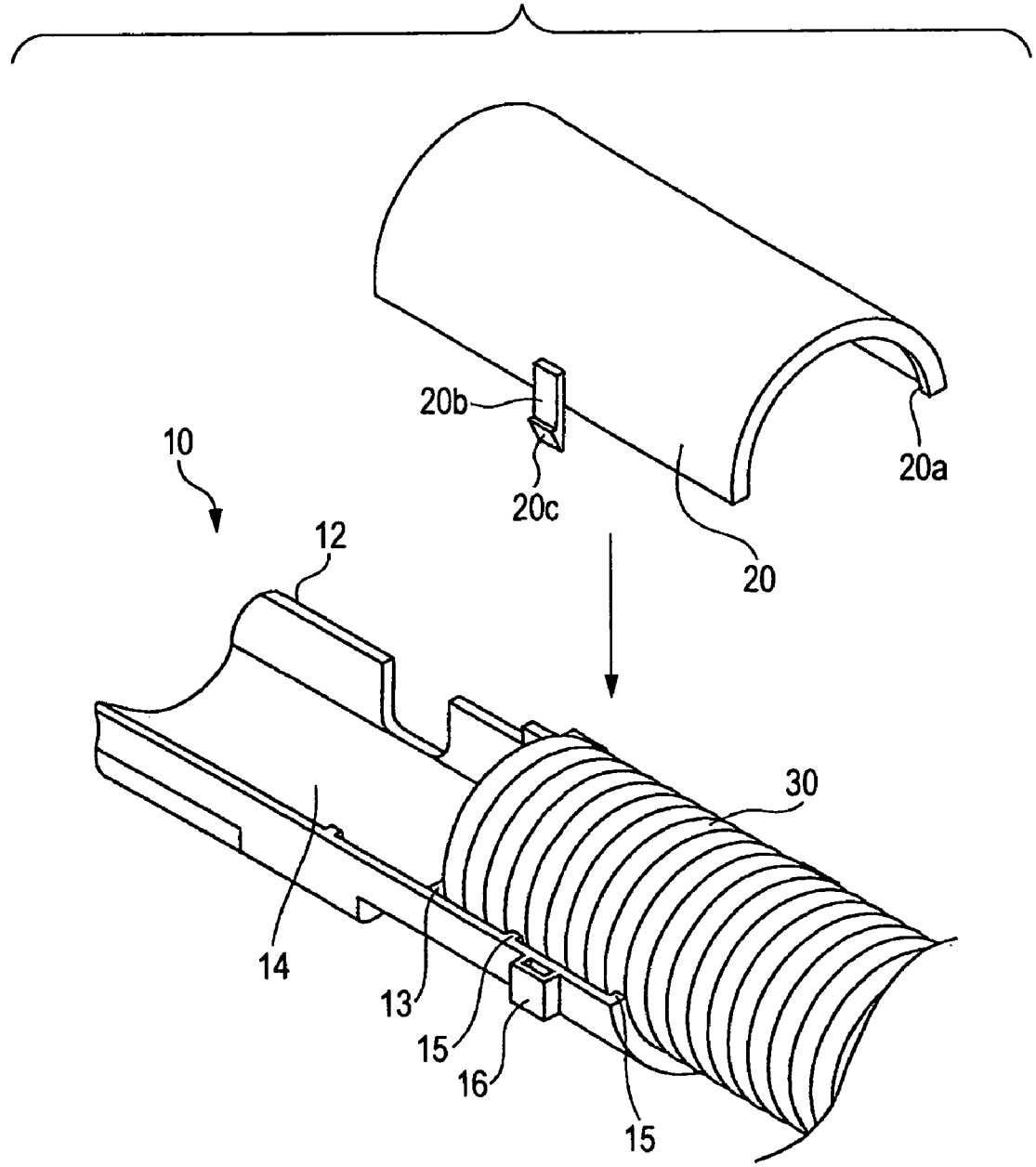
FIG. 2 is a figure showing a state a larger-diameter corrugated tube is attached on the protector body.

With reference to the drawings, an embodiment of the present invention will be explained.

FIGS. 1 to 4 show an embodiment of the present invention. A resin-make protector 10 has an attachment 11 for a corrugated tube armoring an electric wire. For the attachment 11, there are prepared a semi-annular portion 13 provided at a tip of a protector body 12, a large-diameter lid 20 for a larger-diameter corrugated tube 30 covering and closing an upper opening of the semi-annular portion 13, a smaller-diameter lid 21 for a smaller-diameter corrugated tube 30, that are to be employed selectively.

In the protector body 12, the semi-annular portion 13 in a semi-annular form is provided continuing with an electric-wire receiver 14 in a trough portion form formed with a bottom wall 14a and both sidewalls 14b protruding from widthwise both ends of the bottom wall 14a, as shown in FIG. 1. The semi-annular portion 13 has an inner diameter nearly equal to an outer diameter of the larger-diameter corrugated tube shown in FIG. 2. The corrugated tube 30 at its lower half is to be received in the semi-annular portion 13. In the inner periphery of the semi-annular portion 13, circumferentially-extending ribs 15 project at a tip end and at a required position spaced lengthwise from the tip end of the protector body 12. The ribs 15 are to fit in trough portions 30a, 31a of a ridge-and-trough portion continuing lengthwise of the larger-diameter corrugated tube 30 or of the smaller-diameter corrugated tube 31, thus structurally making it possible to fix the larger or smaller one of the corrugated tubes 30, 31 in position in the attachment 11.

Meanwhile, lock frames 16 are provided on an outer surface at diametrical both ends of the semi-annular portion 13, for engagement of lock claws 20c, 21d of the larger or smaller diameter lid 20, 21.

The larger-diameter lid 20, for use in fitting the larger-diameter corrugated tube 30 on the protector 10, is made in a semi-annular form symmetric in form with the semi-annular portion 13 of the protector body 12, and provided with ribs 20a extending circumferentially in the inner peripheral surface thereof. The ribs 20a are provided in positions opposed to the ribs 15 provided on the semi-annular portion 13 of the protector body 12 on which the larger-diameter lid 20 is to be assembled, whose rib height is nearly equal to that of the rib 15 of the semi-annular portion 13. Meanwhile, lock pieces 20b, having lock claws 20c at tips, are provided directed downward on the outer surface at diametrical both tip ends of the larger-diameter lid 20, in positions opposed to the lock frames 16 of the semi-annular portion 13.

Figure 3:
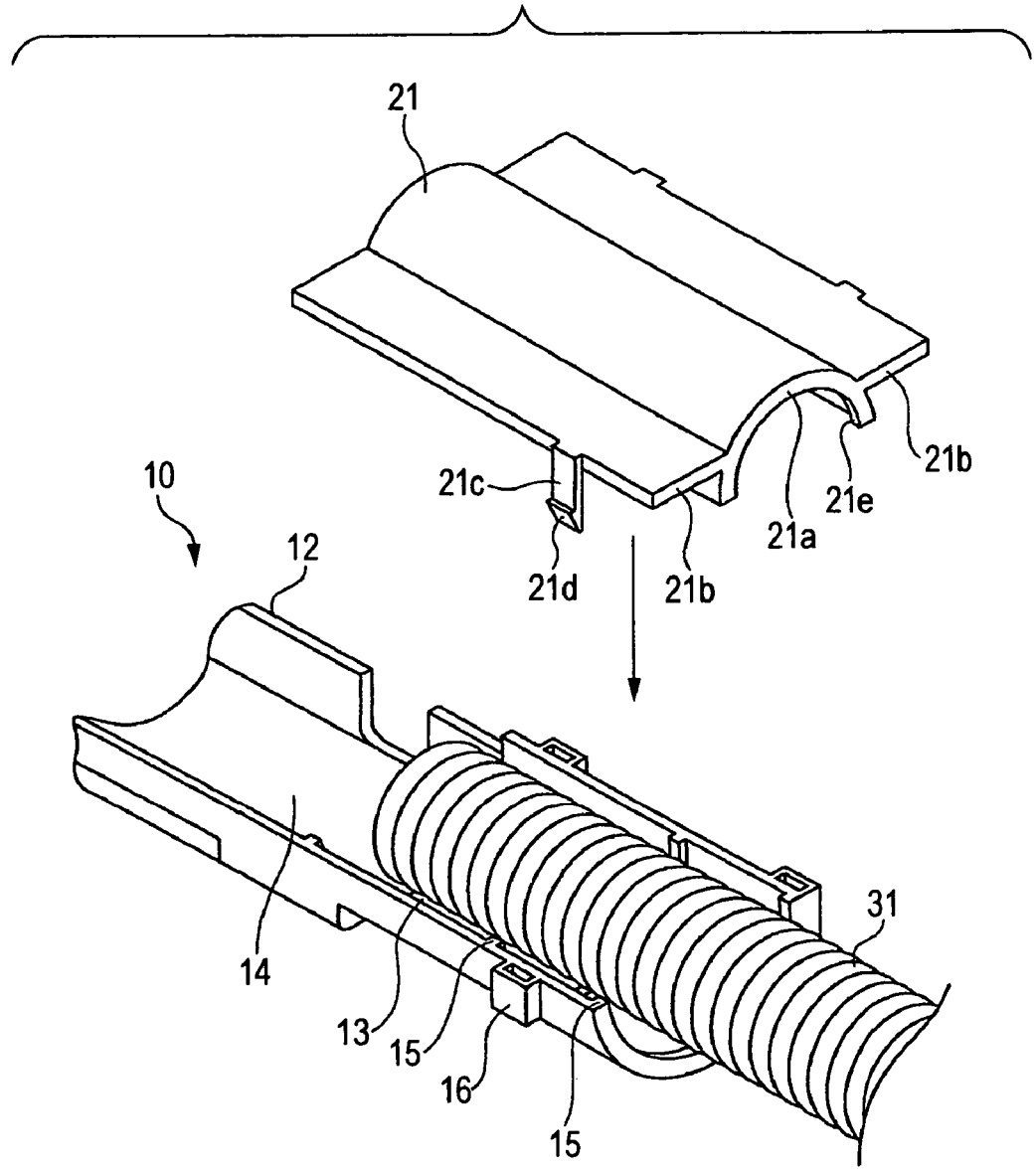
FIG. 3 is a figure showing a state a smaller-diameter corrugated tube is attached on the protector body.

Meanwhile, the smaller-diameter lid 21, for use in fitting the smaller-diameter corrugated tube 31 on the protector 10, is formed, as shown in FIG. 3, by a semi-annular frame 21a to be fit over the upper half of the smaller-diameter corrugated tube 31 and flanges 21b projecting from the respective sides of the outer peripheral surface of the semi-annular frame 21a. The semi-annular frame 21a has an inner diameter made nearly equal to the outer diameter of the smaller-diameter corrugated tube 31. The flanges 21b, projecting from the semi-annular frame 21a, are made projecting sideways from outer-peripheral intermediate points distant circumferentially a required amount from the diametrical both tips of the semi-annular frame 21a. The flanges 21b have respective ends having lock pieces 21c, projecting downward, having lock claws 21d at tips thereof, in positions opposite to the lock frames 16 provided on the semi-annular portion 13 of the protector body 12.

Meanwhile, ribs 21e are provided projected extending circumferentially in an inner peripheral surface of the semi-annular frame 21a. The ribs 21e are provided in positions opposed to the ribs 15 of the Semi-annular portion 13 of the protector body 12, wherein the ribs are made nearly equal in height to the ribs 15 of the semi-annular portion 13.

Figure 4A:
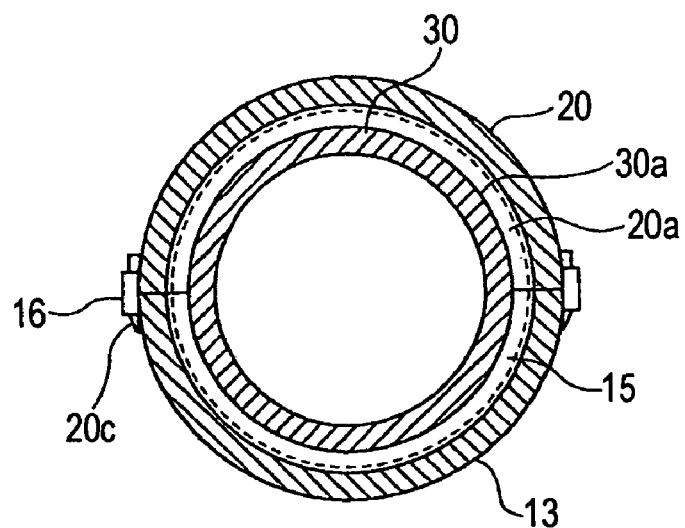

In the case of attaching a larger-diameter corrugated tube 30 in the protector 10, firstly the rib 15 provided in the attachment 13 of the protector body 12 is fit and positioned in a required trough portion 30a in the lower half of the corrugated tube 30. Then, the larger-diameter lid 20 is covered over the attachment 13. The lock claws 20c of the larger-diameter lid 20 are inserted in and engaged with the lock frames 16 of the attachment 13, to join the protector body 12 and the larger-diameter lid 20 together by locking. At this time, as shown in FIG. 4A, the rib 20a of the larger-diameter lid 20 is also fit in a trough portion 30a of the upper half of the corrugated tube 30 whereby the corrugated tube 30 is fixed in position in the protector 10.

Figure 4B:
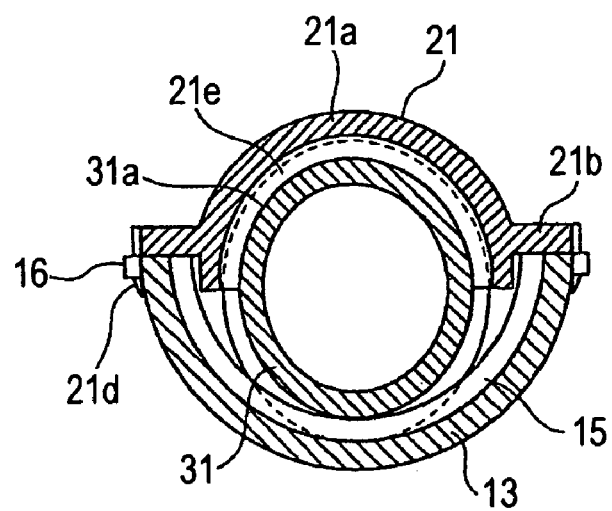
FIG. 4B is a sectional view showing a state the smaller-diameter corrugated tube is attached on the protect.

Meanwhile, in the case of attaching the smaller-diameter corrugated tube 31 in the protector 10, firstly the rib 15 provided in the attachment 13 of the protector body 12 is fit and positioned in a required trough portion 31a in the lower half of the corrugated tube 31. Then, the smaller-diameter lid 21 is covered on the attachment 13. The lock claws 21d of the smaller-diameter lid 21 are inserted in and engaged with the lock frames 16 of the attachment 13, to join the protector body 12 and the smaller-diameter lid 21 together by locking. At this time, as shown in FIG. 4B, the rib 20e of the smaller-diameter lid 21 is also fit in a trough portion 31a of the upper half of the corrugated tube 31 whereby the corrugated tube 31 is positioned and fixed in position in the protector 10.

According to the above structure, when attaching the larger-diameter corrugated tube 30 in the protector 10, the larger-diameter lid 20 can be used which is made symmetric in form with the semi-annular portion 13 of the protector body 12. Meanwhile, when attaching the smaller-diameter corrugated tube 31 in the protector 10, the smaller-diameter lid 21 can be used which has the semi-annular frame 21a corresponding to a diameter of the corrugated tube 31 and flanges 21b projecting at both sides of the semi-annular frame 21a. Thus, the larger-diameter corrugated tube 30 and the smaller-diameter corrugated tube 31, different in diameter, can be selectively fixed in position in the protector 10.

Meanwhile, because the protector body 12 and the lid 20, 21 are provided separate, the protector body 12 can be used commonly for the corrugated tubes 30, 31 different in diameter. Because it is satisfactory to fabricate only the lid matched to a corrugated tube diameter, the protector 10 can be reduced in manufacturing cost.

The semi-annular frame 21a provided in the smaller-diameter lid 21 is made smaller correspondingly to the diameter of the smaller-diameter corrugated tube 31. However, the opposite flanges 21b are projected at intermediate portions of the outer peripheral surface instead of the opposite ends of the outer peripheral surface. This makes it possible to provide a diameter connecting between a lower apex of the semi-annular portion 13 of protector body 12 and an upper apex of the smaller-diameter lid 21 correspondingly to the diameter of the smaller-diameter corrugated tube 31. Accordingly, even in case the smaller-diameter corrugated tube 31 is greatly different from and smaller in diameter than the diameter of the larger-diameter corrugated tube 30, the smaller-diameter corrugated tube 31 can be armored at least in its upper half by the smaller-diameter lid 21. By the ribs 21e projecting from the inner peripheral surface of the smaller-diameter lid 21, fitting is positively effected in the trough portions of the smaller-diameter corrugated tube 31, thus holding the smaller-diameter corrugated tube 31 in position without rattling.

Figure 5:
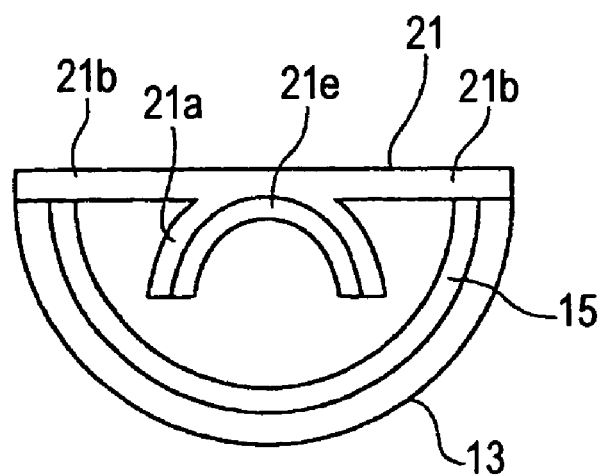
FIG. 5 is a figure showing a modification to the embodiment of the invention.
Figure 6:
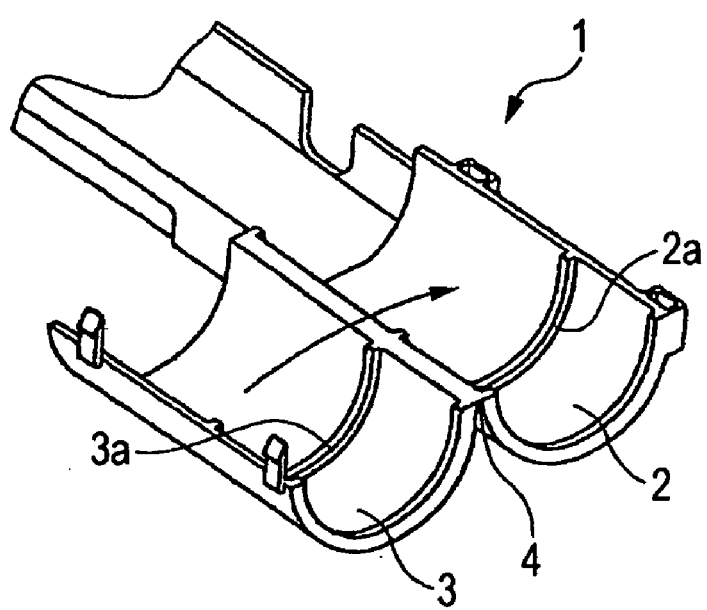
FIG. 6 is a figure showing a related art.
Figure 7A:
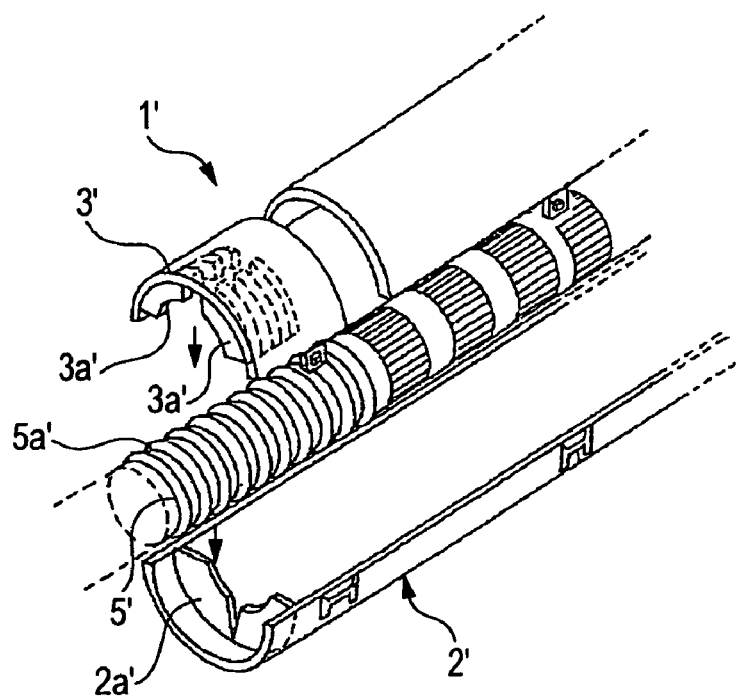
FIGS. 7A and 7B are figures showing another related art.
Figure 7B:
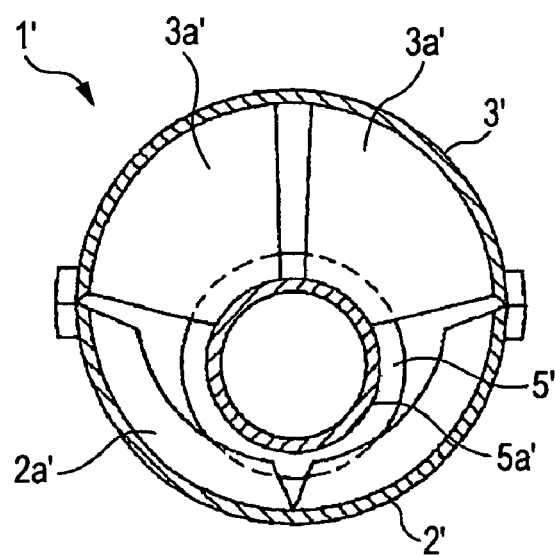
Figure 8:
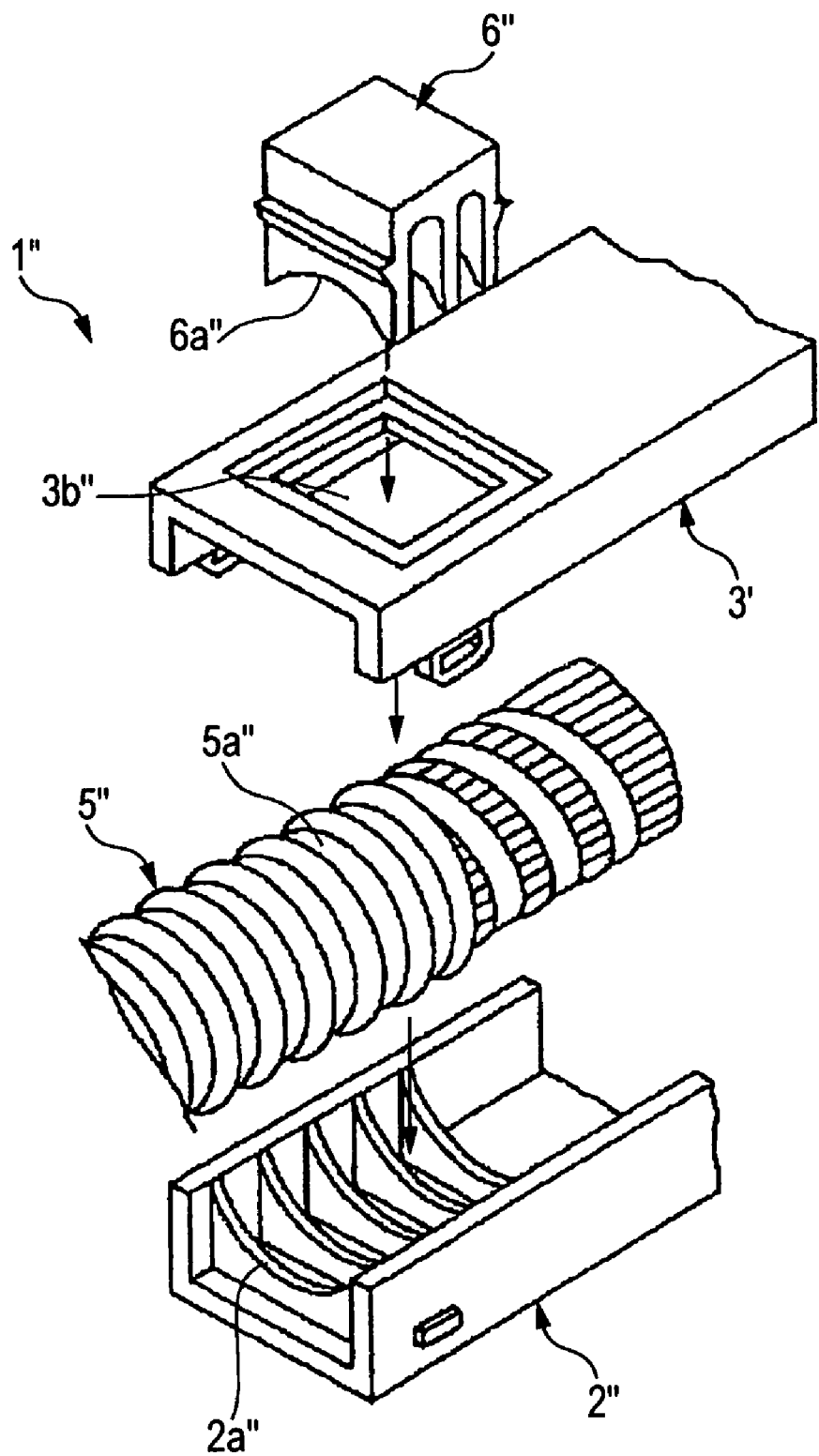
FIG. 8 is a figure showing another related art.

Incidentally, the smaller-diameter lid is not limited in form to the foregoing shape. For example, it may be in a form that flanges 21b project sideways from the upper end of the semi-annular frame 21a, as shown in FIG. 5.

What is claimed is:

1. A protector having an attachment for a corrugated tube attaching an electric wire from outside, the protector comprising:
   a protector body being formed with a semi-annular portion to receive the corrugated tube at a half thereof, the semi-annular portion having an inner peripheral surface projected with a rib to engage with a trough portion of ridge-and-trough portion continuing lengthwise of the corrugated tube;
   a lid being fitted with the semi-annular portion of the protector body, and the lid receiving the corrugated tube at other half thereof, the lid having at least one of larger-diameter lid and a smaller-diameter lid in accordance with a diameter of the corrugated tube, the larger-diameter lid being symmetrically formed with the semi-annular portion of the protector body and having a lock portion and a locked portion at both ends in a direction of diameter thereof which are abut with, the smaller-diameter lid having: a flange portion projecting from both sides of semi-annular frame portion corresponding to a diameter of small-diameter corrugated tube; and a rib projecting in an inner peripheral surface of the semi-annular frame portion to engage with a trough portion of the small diameter corrugated tube, the flange portion having a lock portion at a tip of both sides of the semi-annular frame portion, the lock portion of the flange portion capable of locking with a locked portion of the semi-annular frame portion.

2. A protector according to claim 1, wherein the rib provided in the inner peripheral surface of the semi-annular portion of the protector body and the rib provided in the semi-annular frame portion of the smaller-diameter lid are the same in height.

3. A protector according to claim 2, wherein the smaller-diameter lid has the flange portion projecting from outer peripheral intermediate point distant a required amount from respective tips of the semi-annular frame portion.

4. The protector according to claim 1, wherein the protector body is separately formed with the lid.

5. A protector having an attachment for a corrugated tube attaching an electric wire from outside, the protector comprising:

a protector body being formed with a semi-annular portion to receive the corrugated tube at a half thereof, the semi-annular portion having an inner peripheral surface projected with a rib to engage with a trough portion of ridge-and-trough portion continuing lengthwise of the corrugated tube; and a lid being fitted with the semi-annular portion of the protector body, and the lid receiving the corrugated tube at other half thereof, the lid having a diameter in accordance with a diameter of the corrugated tube, the lid having: a flange portion projecting from both sides of semi-annular frame portion corresponding to a diameter of the corrugated tube; and a rib projecting in an inner peripheral surface of the semi-annular frame portion to engage with a trough portion of the corrugated tube, the flange portion having a lock portion at a tip of both sides of the semi-annular frame portion, the lock portion of the flange portion capable of locking with a locked portion of the semi-annular frame portion.

6. The protector according to claim 5, wherein the protector body is separately formed with the lid.

* * * * *